US012690568B2

(12) United States Patent

Balshaw

(10) Patent No.: US 12,690,568 B2
(45) Date of Patent: Jul. 28, 2026

(54) LEASH WITH SLIP COLLAR AND COLLAR ATTACHMENT FOR ADDED SAFETY

(71) Applicant: Rex Dog Hotel & Spa Ltd, Vancouver (CA)

(72) Inventor: Barrie Edward Balshaw, Vancouver (CA)

(73) Assignee: Rex Dog Hotel & Spa Ltd, Vancouver (CA)

( * ) Notice: Subject to any disclaimer, the term of this patent is extended or adjusted under 35 U.S.C. 154(b) by 0 days.

(21) Appl. No.: 18/812,264

(22) Filed: Aug. 22, 2024

(65) Prior Publication Data

US 2026/0053115 A1      Feb. 26, 2026

(51) Int. Cl.
A01K 27/00         (2006.01)

(52) U.S. Cl.
CPC .......... A01K 27/003 (2013.01); A01K 27/001 (2013.01); A01K 27/005 (2013.01)

(58) Field of Classification Search
CPC .................................................... A01K 27/003
See application file for complete search history.

(56) References Cited

U.S. PATENT DOCUMENTS

| | | | | |
|---|---|---|---|---|
| 2008/0134989 A1* | 6/2008 | Weiss | ................... | A01K 27/003 |
| | | | | 119/793 |
| 2013/0133591 A1* | 5/2013 | Silva | .................... | A01K 27/002 |
| | | | | 119/793 |
| 2014/0083371 A1* | 3/2014 | McCrocklin | ......... | A01K 27/003 |
| | | | | 119/795 |
| 2015/0237831 A1* | 8/2015 | Beck | .................... | A01K 27/003 |
| | | | | 119/795 |
| 2017/0142936 A1* | 5/2017 | Louro | ................. | A01K 27/005 |
| 2020/0214260 A1* | 7/2020 | Beck | .................... | A01K 27/001 |
| 2020/0359603 A1* | 11/2020 | Rhein | ................. | A01K 27/001 |
| 2021/0185985 A1* | 6/2021 | Therrian | .............. | A01K 27/002 |
| 2024/0081290 A1* | 3/2024 | Palmerton | ............ | A01K 27/006 |

* cited by examiner

Primary Examiner — Jessica B Wong
(74) Attorney, Agent, or Firm — Perpetual Motion Patents

(57) ABSTRACT

A leash for walking and controlling an animal, such as a dog, is provided with redundant connections in a single leash. The leash includes a quick-release clip for connecting to the fixed collar on the animal and a slip collar. The slip collar is normally slack, unless the animal escapes the quick-release clip or collar or harness. The slip collar is arranged to slide into a 'choke collar' configuration during this attempted escape. This single leash advantageously provides for redundancy.

14 Claims, 5 Drawing Sheets

LEASH WITH SLIP COLLAR AND COLLAR ATTACHMENT FOR ADDED SAFETY

FIELD OF THE INVENTION

The disclosure generally relates to a leash, such as a dog lead with a size adjustable slip collar and an attachment means to an existing collar/harness for added safety and security.

BACKGROUND OF THE INVENTION

A typical dog leash comprises a strap with a connector such as a connector clip or carabiner that can be attached to the dog's collar or harness. While this type of leash works when the dog is calm, it can easily be pulled off when he is agitated. A dog can easily be triggered by another animal such as a squirrel or another dog. Moreover, dogs in training and dogs that are frightened can be difficult for the handler to control. This poses a safety issue for the dog, the handler as well other humans, especially children. Therefore, there is a need for a lead/leash that can control the dog by preventing him from being detached from his collar/harness.

There exists a slip collar also known as a choker, choke collar and also prong collar which are a type of collar containing a strap/rope or a chain with one end attached to a loop such as an O-ring or a sliding ring and the other end directed through the loop which can be attached to the leash or which makes up the leash. An anxious dog that is pulling on the leash makes the slip collar wrap tightly around his neck which prevents the dog from escaping.

While the above forceful method of controlling dogs is necessary at times, it is not always needed. In other words, a dog that is only slightly pulling on the leash may make the collar keep wrapping tightly around his neck especially during runs, hikes or long walks with the handler. The constant pressure around the dog's neck can be very uncomfortable and unnecessary for the dog and can pose a threat to his health.

Therefore, there exists a need for a leash that only engages the slip collar in uncontrollable situations while keeping the dog safe and comfortable at all other times. This type of leash is especially useful for dog trainers and dog walkers as dogs that are not accustomed to unfamiliar handlers and can easily become anxious.

SUMMARY OF THE INVENTION

In accordance with the disclosure, there is provided a dual-purpose dog leash that comprises a slip collar that is only activated when needed to secure an uncontrollable dog and an attachment that connects to the dog's existing collar/harness at all other times.

In one general aspect, a leash may include a length of webbing. The leash also includes a ring connected to a distal end of the webbing; the ring sized to pass the distal end of the webbing back through the ring to form a slip collar. The Leash may include a quick-release clip fixed to the webbing at a distance D from the distal end, where D is selected to be greater than a circumference of a dog's neck.

In one general aspect, the invention provides a method of walking a dog using a single leash having both a quick-release clip and a loop forming a slip collar. The method includes connecting the quick-release clip to a fixed collar or harness on the dog; placing the slip collar over the dog's neck with slack in the slip collar; and in response to the quick-release clip or collar or harness coming undone, pulling on the leash to close the loop around the dog's neck.

BRIEF DESCRIPTION OF THE DRAWINGS

Various objects, features and advantages of the invention will be apparent from the following description of embodiments of the invention, as illustrated in the accompanying drawings.

DETAILED DESCRIPTION OF THE INVENTION

With reference to FIGS. 1 through 5, there is provided an animal handling means such as a dog leash which combines the use of a regular fixed collar or harness to ensure safety and comfort and a slip collar which is only engaged when the dog is agitated and disconnects from his fixed collar or harness.

Figure 1:
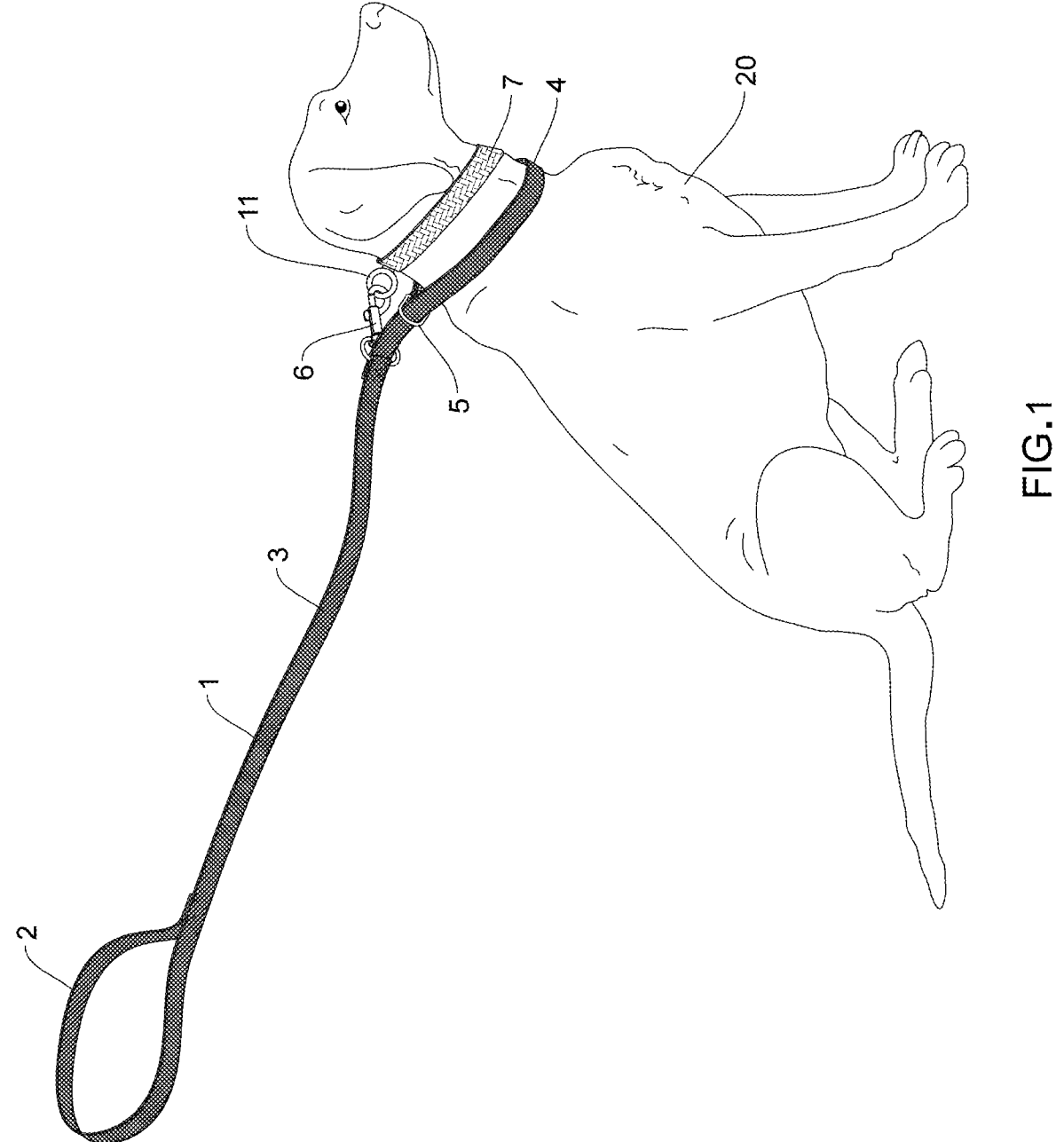
FIG. 1 is a leash with a slip collar and safety attachment in accordance with some embodiments of the invention, as worn by a dog.
Figure 2:
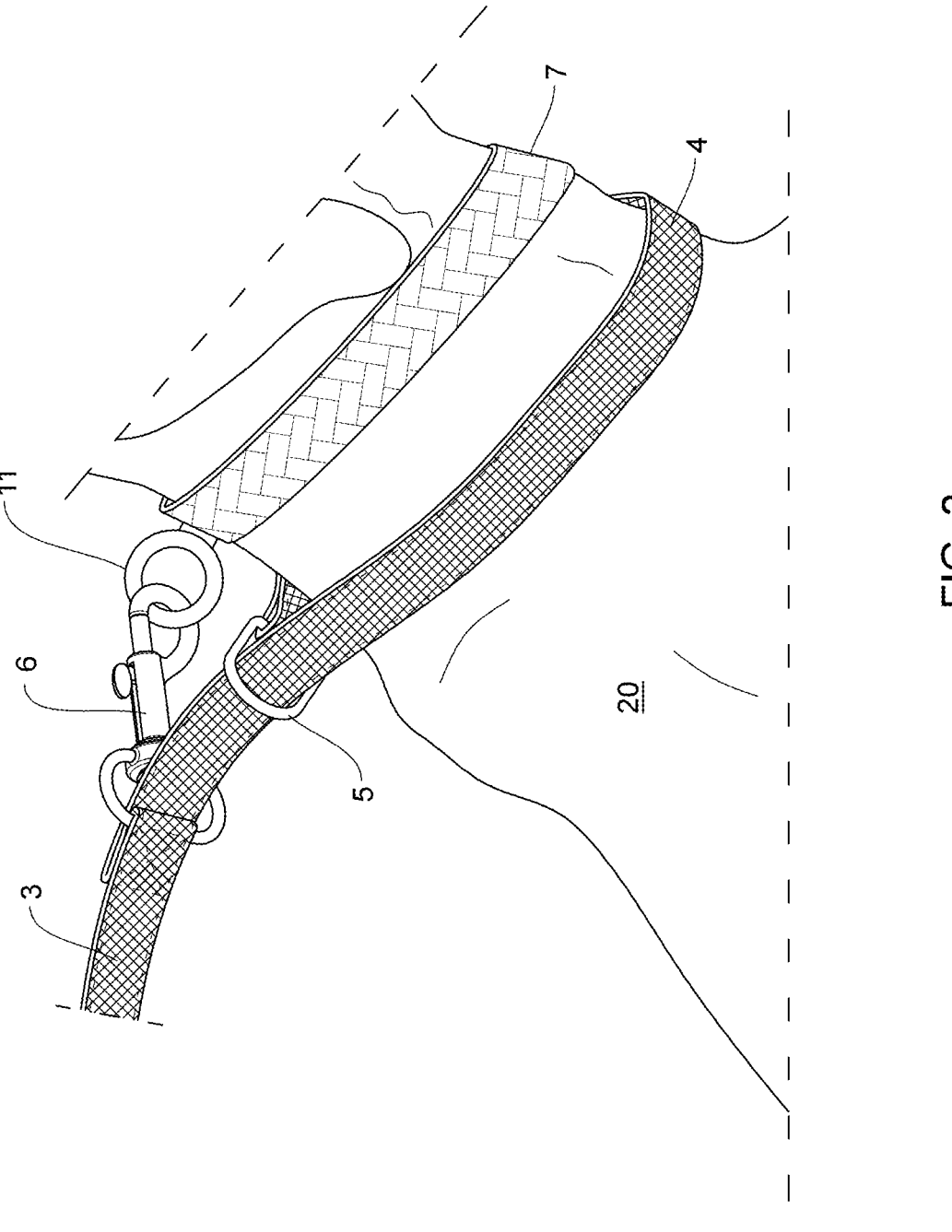
FIG. 2 is a close-up view of the slip collar and safety attachment of FIG. 1.

FIG. 1 shows a Dog 20 held by leash 1 by connector clip 6 to create a fixed connection and held redundantly by slip collar 4. As seen in the detail of FIG. 2, the slip collar is normally slackly formed around the dog's neck but may tighten to act as a 'choke collar' if the fixed collar connection is lost.

As used herein, the term "quick release clip" or "connector clip" refers to a connector compatible with existing dog collars/harnesses with the ability to quickly connect a leash to a fixed collar.

As used herein, the terms "sliding ring", "ring" and like refer to the same interpretation and may be interchangeably used throughout the specification.

Figure 3:
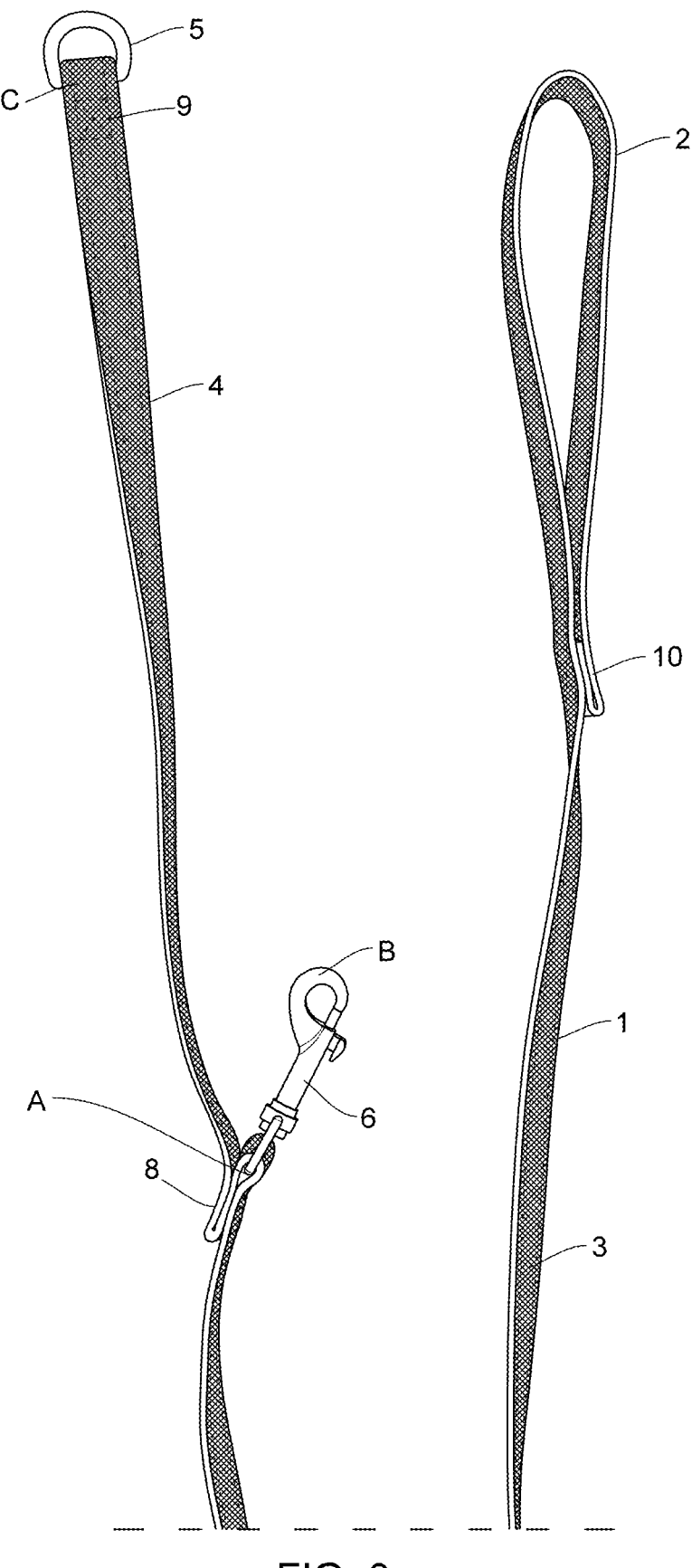
FIG. 3 is a side elevation view of the leash showing details of the ends.

As shown in FIG. 3, leash 1 is formed of webbing 3 woven throughout and affixed at various locations (8, 9, 10) of leash 1 to provide a single piece of a dog lead/leash. Proximal end of leash 1 (relative to the handler) is attached to itself to create a loop that forms hand loop 2 that is designed to be worn around the handler's wrist. Similarly, connector clip 6 is attached to leash 1 by inserting connector clip 6 through leash 1 and firmly attaching leash 1 close to where a loop is formed back on itself and at a distance away from the distal end of leash 1 (relative to the handler) where the distance is greater than the circumference of a dog's neck. In some embodiments, leash 1 has a typical length of 4-8 ft (1.2-2.4 meters), for example 6 ft (1.8 meters).

Connector clip 6 is used as the attachment means that connects leash 1 to an existing dog collar/harness (for example, fixed collar 7). In normal use, connector clip 6 acts as the main connector between dog 20 and his handler.

In some embodiments, connector clip 6 can be any form of a connector compatible with existing dog collars/harnesses with the ability to quickly connect leash 1 to fixed collar 7. For example, connector clip 6 may be a connector hook such as a swivel hook or shackle, a removable sliding bolt, bolt snap, a carabiner hook or any other type of quick-release, biased-closed or snap-lock fastener. Furthermore, connector clip 6 can be made with metal, such as stainless steel, solid brass and the like, or made of durable plastic.

Figure 4:
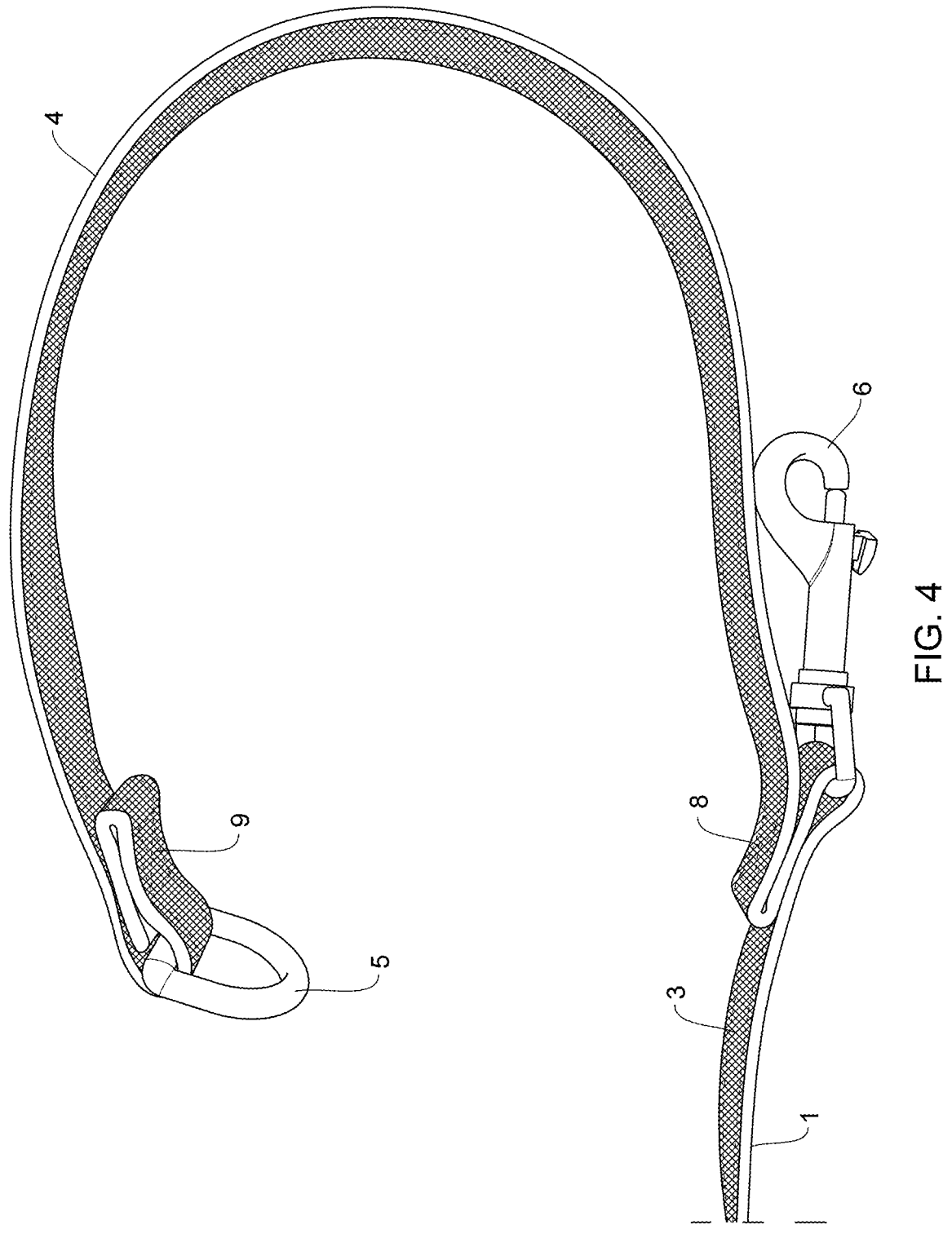
FIG. 4 is a side elevation view of the leash's distal end in an open configuration.
Figure 5:
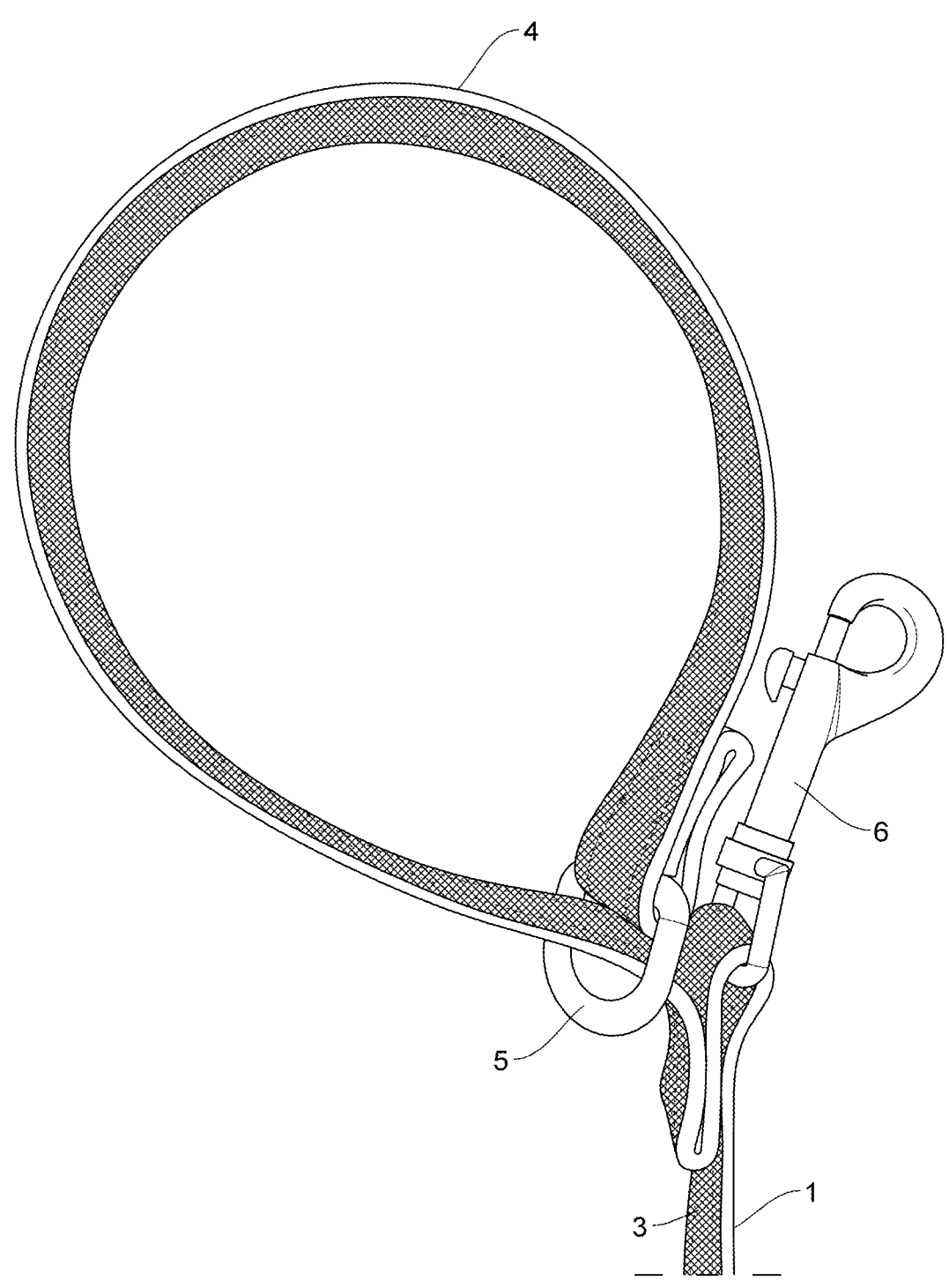
FIG. 5 is a side elevation view of a distal end in a looped configuration.

FIG. 4 shows the distal end where webbing length 4 is not formed into a slip collar. The slip collar is formed by inserting the distal end of leash 1 through sliding ring 5, which is fixed at the distal end of leash 1. This results in the loop, as shown in FIG. 5. Preferably, webbing 3 of leash 1 is a single-piece leash system forming fixed attachment points for hand loop 2 (for example, attachment point 10), connector clip 6 (for example, see attachment point 8 in FIG. 3) and sliding ring 5 (for example, attachment point 9). Slip collar from FIG. 2 is formed by passing the distal end of webbing 3 back through sliding ring 5 and sliding along until a loop is formed, as shown in FIG. 5. In alternative embodiments, leash 1 can be formed with more than one piece of webbing 3. For example, leash 1 may comprise a first piece of webbing 3 that forms hand loop 2 through to connector clip 6 and a second piece of webbing 3 that is attached to the first piece of webbing 3 to form slip collar 4. This type of leash, although contains two pieces of webbing 3, may still be considered to be a single leash 1 where all the components are integrated as opposed to alternative leash systems with removable attachments or multiple leashes.

It should be noted that sliding ring 5 can be any form of closed ring such as a D-ring, an O-ring, square ring or any other shape of a closed ring that is made of a durable material able to withstand the strain on a dog. Sliding ring 5 can be made with metal such as stainless steel, solid brass and the like or durable plastic. Furthermore, although connector clip 6 is secured in a loop of webbing 3, it is able to rotate in all directions.

As previously mentioned, webbing 3 can be attached back on itself at various positions (for example, attachment points 8-10) to form points of attachment for hand loop 2, connector clip 6 and sliding ring 5. These attachments of the webbing can be achieved by one or more of a) sewing, b) riveting c) adhesive, or d) controlled melting of the webbing material. Furthermore, attaching of webbing 3 can be formed by a single loop back on itself or a double loop back on itself to ensure firm attachment at each location. A double loop, as shown in FIG. 3, has a cleaner finish as the ends are hidden, i.e., they do not poke out.

Connector clip 6 can be used to attach leash 1 to an existing dog collar/harness with ease and speed. This is especially needed for dog training purposes as the dog may be anxious and agitated around unfamiliar faces which would make it otherwise difficult to put on. In some embodiments, the handler would first put on slip collar 4 over the dog's head and around his neck and slip collar 4 would loosely and comfortably sit alongside/adjacent fixed collar 7. The handler would then proceed to connecting connector clip 6 to collar ring 11 of fixed collar 7 to complete attaching leash 1 to dog 20. In some embodiments, fixed collar 7 can be replaced with a harness (not shown).

Slip collar 4 sits loosely and comfortably around dog 20's neck at all times, except if dog 20 becomes alarmed and tries to escape. Immediately after dog 20 escapes from fixed collar 7, the pulling on leash 1 slides sliding ring 5 which makes slip collar 4 become tight around dog 20's neck and very unlikely for the dog to escape. The tightness of slip collar 4 restrains the dog and trains him to stop misbehaving. Once dog 20 is calm, slip collar 4 can be loosened at which point fixed collar 7 can also be re-attached. In some embodiments, the tightness of slip collar 4 may be self-loosened after removal of tension or by manually loosening it by placing the handler's fingers under slip collar 4 and pulling it loose.

Fixed collar 7 and slip collar 4 are known in the art. However, having one or the other has its pros and cons. For example, fixed collar 7 is fixed snugly around dog 20's neck (alternatively, around dog 20's chest and shoulders if using a harness) and therefore does not induce tension or discomfort. Fixed collar 7 is therefore sufficient for handling dog 20 when he is calm. However, the downside of fixed collar 7 is that dog 20 can slip out of the collar, escape from the collar/harness by chewing on it or forcefully unhook from collar ring 11, whenever he is anxious or frightened. This sudden change of behaviour could cause harm to the dog, his handler, bystanders, and property. On the other hand, slip collar 4 would sit loose around dog 20's neck when the dog is calm and tighten whenever the dog/handler pulls on leash 1, which would prevent dog 20 from escaping. However, slip collar 4 needs to be readjusted every time leash 1 is pulled to ensure comfort and prevent injury to the dog.

According to the present disclosure, leash 1 accomplishes both the comfort of fixed collar 7 and control of slip collar 4 by redundantly combining the two leashes into one integrated leash system (i.e., leash 1), preferably with a single webbing (webbing 3) throughout. As previously mentioned, slip collar 4 can be easily slipped over dog 20's head and connector clip 6 can be attached to collar ring 11 of fixed collar 7 with ease and speed. As a result, dog handlers such as dog owners, trainers, walkers and veterinarians may utilize leash 1 for its ease and speed of engaging and disengaging. Moreover, slip collar 4 is only engaged whenever dog 20 escapes fixed collar 7. Specifically, if/when dog 20 escapes fixed collar 7, applying significant pressure on leash 1 (for example, by pulling) makes slip collar 4 tighten around dog 20's neck to an increasingly small diameter, making it impossible for the dog to escape. This signals the dog to stop pulling and teaches him that tugging/pulling on leash 1 is bad behaviour. Therefore, this type of combination leash system could help dog trainers and dog walkers to ensure proper control of the animal without inducing constant pressure.

As shown in FIG. 3, point A is the attachment point of connector clip 6 to webbing 3, point B is the end of connector clip 6 where connector clip 6 attaches to fixed collar 7 via collar ring 11, and point C is the attachment point of sliding ring 5 to webbing 3, where slip collar 4 terminates. In order for slip collar 4 to be engaged as soon as dog 20 escapes from fixed collar 7, there is a range of acceptable lengths that ultimately determines the "slack" of leash 1. In some embodiments, the distance from point A to point C (herein denoted as webbing length D) includes an acceptable range of slack when slip collar 4 is formed around dog 20's neck and fixed collar 7 is connected to leash 1 via connector clip 6. Therefore, the length of point A to point C should be greater than the combined length of point A to point B and the circumference of dog 20's neck, as shown below:

$$\text{length}|A \text{ to } C|>\{\text{length}|A \text{ to } B|+\text{circumference of } dog\ 20\text{'s neck}\}$$

However, as some dogs are smaller than others, the length of slip collar 4 may be different to fit each dog. Therefore, the portion of webbing 3 that runs from point A to point C may come in a range of lengths to fit a dog of any size, while keeping the slack constant. In other words, the maximum diameter of slip collar 4 may come in a variety of dimensions to be worn by a dog of any size. For example, the length from point A to point C can be approximately 14 inches (35 cm) for a small sized leash, 20.5 inches (52 cm) for a medium sized leash and 28.5 inches (72 cm) for a large sized leash. The length from point A to point B (a.k.a., the size of connector clip 6) is typically 2-4 inches (5-10 cm) depending on the size of the leash. For example, the length from point A to point B for a small sized leash is 2.5 inches (6.35 cm), such as a 2.5-inch (6.35 cm) bolt snap and the length from point A to point B for a medium to large sized leash is 3 inches (7.62 cm), such as a 3-inch (7.62 cm) bolt snap. When leash 1 is attached to dog 20 via fixed collar 7 and slip collar 4, this leaves a slack of approximately 2-3 inches (5-7.6 cm) for any sized leash. For example, for a small dog with a neck circumference of 9 inches (22.9 cm) wearing a slip collar of 14 inches (35.6 cm), the distance from point A to point C will leave an extra 5 inches (12.7 cm) of webbing 3. Since A to B is 2.5 inches (6.35 cm) that leaves an extra 2.5 inches (6.3 cm) as slack. If the slack is less than the acceptable range, it would cause slip collar 4 to be too tight around dog 20's neck which could choke dog 20 for example when dog 20 bends over. If the slack is too much it could easily fall off dog 20's neck for example when dog 20 tries to run away. Therefore, keeping the slack between 2-3 inches (5-8 cm) allows proper control of dog 20 without too much or too little slack.

In some embodiments, leash 1 can be formed with a material such as Nylon or any other type of material which allows for flexibility, strength and lightweight such as polypropylene, rope, cord, hemp, etc. Leash 1 is approximately 5⅝ inches or 1.6 cm (small leash), ¾ inches or 1.9 cm (medium and large leash) wide and 1-3 mm thick. The length of leash 1 from Hand loop 2 to connector clip 6 is 4-8 ft (1.2-2.4 meters). For purposes of illustration, hand loop 2 is shown to have a fixed diameter as the proximal end of leash 1 is firmly attached to webbing 3 at a distance away from the proximal end to form hand loop 2. An adjustable hand loop may cause too much pressure on the dog handler which could lead to pain and injury when leash 1 is suddenly pulled. Therefore, the length of hand loop 2 may be approximately 8 inches (20.3 cm) to fit an average person's wrist. However, leash 1 can also be formed with a range of wrist sizes such as small, medium and large to fit handlers of any size.

In some embodiments, the width of webbing 3 can be slightly wider than the effective inner diameter of sliding ring 5 such that it causes an interference fit for webbing 3 running through sliding ring 5. For example, the width of webbing 3 may be at least 1 mm wider than the inner diameter of sliding ring 5, which causes webbing 3 to slide along sliding ring 5 with some friction, such that slip collar 4 neither falls down on dog 20's neck when the dog is only slightly pulling on leash 1 for purposes such as bending over or moving, nor falls off dog 20's neck under too much slack. Under normal circumstances, slip collar 4 sits loosely around dog 20's neck and when there is significant tension on leash 1, webbing 3 overcomes the interference fit of sliding ring 5, which causes tightness around dog 20's neck. In order for slip collar 5 to wrap tightly around dog 20's neck, webbing 3 can be deformed when passed through sliding ring 5 to provide the interference sliding. The friction between webbing 3 and sliding ring 5 acts as an added safety measure which ensures that slip collar 4 would sit in the most open position to provide the dog comfort at all times unless it is absolutely necessary to be tightened. This is especially useful for small dogs who are more prone to injury.

Connector clip 6 can have various sizes and shapes. For example, for small dogs, a small leash with a connector clip such as a 2.5-inch (6.35 cm) bolt snap can be used. Similarly, for medium to large dogs, a medium sized or a large sized leash with a 3-inch (7.62 cm) bolt snap can be used.

For purposes of illustration, proximal end of leash 1 may be referred to as the end of leash 1 that is in close proximity to the handler and the distal end of leash 1 may be referred to as the end of leash 1 that is in close proximity to dog 20.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

The invention claimed is:

1. A leash comprising:
a length of webbing;
a ring connected to a distal end of the webbing, the ring sized to pass the distal end of the webbing back through the ring to form a slip collar; and
a quick-release clip fixed to the webbing at a length D from the distal end, wherein D is selected to be greater than a circumference of a dog's neck
and wherein the quick-release clip is fixed by one or more of a) sewing, b) riveting c) adhesive, or d) controlled melting of the webbing.

2. The leash of claim 1, further comprising a hand loop formed at a proximal end of the webbing.

3. The leash of claim 1, wherein the quick-release clip is fixed by fixing the webbing to itself using at least one of a: rivet, sewing, and adhesive.

4. The leash of claim 1, wherein
a) length D is greater than
b) a length of the quick-release clip plus the circumference of the dog's neck.

5. The leash of claim 1, wherein
a) length D is greater than
b) a length of the quick-release clip plus the circumference of the dog's neck,
by an amount to create slack in the formed slip collar, which slack is between 5 and 8 cm.

6. The leash of claim 1, wherein length Dis 35 to 72 cms.

7. The leash of claim 1, wherein the webbing consists of a single length of webbing.

8. The leash of claim 1, wherein the webbing is composed of woven Nylon, polypropylene, rope, cord, or hemp.

9. The leash of claim 1, wherein the ring has a D-ring, O-ring or square shape.

10. The leash of claim 1, wherein the ring is sized to create a sliding fit with the webbing passing therethrough.

11. The leash of claim 1, wherein the ring is sized to create an interference fit with the webbing passing therethrough.

12. The leash of claim 1, wherein the quick-release clip is arranged to connect to a ring of a fixed collar or harness, such that, in normal use, the slip collar is slack and the quick-release clip is taut.

13. The leash of claim 1, wherein the slip collar is redundant when in normal use and taut when the dog escapes.

14. A method of walking a dog using the a single leash of claim 1, the method comprising:
connecting the quick-release clip to a fixed collar or harness on the dog;
placing the slip collar over the dog's neck with slack in the slip collar; and in response to the quick-release clip or collar or harness coming undone, pulling on the leash to close the loop around the dog's neck.

* * * * *